United States Patent [19]

McAllister et al.

[11] 4,209,137
[45] Jun. 24, 1980

[54] FORAGE HARVESTER CUTTERHEAD WITH BAFFLE MEANS

[75] Inventors: Ronald L. McAllister, New Holland; Edward H. Priepke, Stevens; Robert A. Wagstaff, New Holland, all of Pa.

[73] Assignee: Sperry Rand Corporation, New Holland, Pa.

[21] Appl. No.: 7,117

[22] Filed: Jan. 29, 1979

[51] Int. Cl.² .............................................. B02C 18/18
[52] U.S. Cl. ...................................... 241/221; 241/294
[58] Field of Search ...................... 241/221, 222, 282.2, 241/294; 83/356.3, 673, 674

[56] References Cited

U.S. PATENT DOCUMENTS

| | | | |
|---|---|---|---|
| 3,342,230 | 9/1967 | Waldrop | 241/282.2 X |
| 3,357,467 | 12/1967 | Morkoski | 241/222 X |
| 3,713,471 | 1/1973 | Sadler | 241/221 X |
| 3,729,143 | 4/1973 | Wagstaff et al. | 241/282.2 |
| 3,873,038 | 3/1975 | Wagstaff | 241/221 X |
| 3,876,159 | 4/1975 | Kidd | 241/222 X |
| 4,061,284 | 12/1977 | Raisbeck et al. | 241/294 |

Primary Examiner—Howard N. Goldberg
Attorney, Agent, or Firm—C. Hercus Just; Frank A. Seemar; John B. Mitchell

[57] ABSTRACT

A rotatable cutterhead for a forage harvester having a plurality of parallel support members within plans perpendicular to a central shaft and spaced axially therealong. A plurality of similar chopping blades are affixed in circumferentially spaced relationship to each other around the support members, whereby the interior of said cutterhead is open and susceptible to ingress of cut forage material. Baffle strips extend from each blade inwardly from and adjacent the cutting edge at a sufficient distance and angle to deter the ingress of cut material into the interior of said cutterhead.

7 Claims, 4 Drawing Figures

FORAGE HARVESTER CUTTERHEAD WITH BAFFLE MEANS

BACKGROUND OF THE INVENTION

The invention pertains to harvesting machines and more particularly to the rotary cutting heads associated with feed rollers which receive various forage materials as cut from a field and usually consolidated before feeding a stream of said material to the cutterhead which chops it into fine particles and passes the chopped produce to a blower which sends it to a wagon or into a vertical fill pipe adjacent a silo or the like.

One very popular type of rotary cutting head presently in use is that shown in prior U.S. Pat. No. 3,873,038 to Wagstaff dated Mar. 25, 1975, and U.S. Pat. No. 3,713,471 to Sadler dated Jan. 30, 1973, which have a plurality of cutting or chopping blades extending between parallel disc-type support members spaced axially along a shaft and fixed thereto for rotation therewith, said blades being spaced from each other around the peripheries of said support members. This results in the interior of said cutterhead being quite open and susceptible to chopped material passing into the interior of said head and rotating around therewith, as carryover, a certain amount before being thrown therefrom by other incoming material, or until it is accelerated to a sufficient speed to cause it to move to the periphery due to centrifugal force. In either instance chopping efficiency is diminished appreciably. The problem does not exist to any substantial extent in cylindrical type cutterheads as in U.S. Pat. No. 4,061,284, to Raisbeck et al, dated Dec. 6, 1977, in which a cylindrical tube has brackets welded thereto in a certain pattern.

Still another U.S. Pat. No. 3,876,159 to Kidd, dated Apr. 8, 1975, shows a cutterhead which is of the open interior type but employs so-called J-shaped blades, which are more costly than simple blades made from substantially flat stock. In a blade of this nature the tail is substantially different in location and attitude then knife and baffle arrangement of the present invention.

Due to the fact that many harvesters are in existence which have the so-called open type cutterheads, especially of the type shown in said Wagstaff and Sadler patents, but which are inefficient because of the occurrence of carryover of chopped material therein, it is one of the principal objectives of the present invention to improve the efficiency thereof by the addition of baffle members to the existing blades and this can be accomplished with relative ease and small expense without undertaking any extensive revision of said heads, by adapting the present invention thereto.

SUMMARY OF THE INVENTION

As indicated above, the primary object of the invention is to minimize carryover of chopped material in the interior of so-called open type cutterheads, and especially those having disc-type support members upon the peripheries of which simple type blades are affixed in circumferentially spaced relationship to each other, by adding baffle strips to said support members co-extensive in length to the blades and extending inwardly therefrom adjacent but spaced from the cutting edges of said blades and in a plane substantially perpendicular to the inner surfaces of said blades. In one embodiment the strips are held operatively adjacent said blades by simple clamp members or brackets affixed to a flat surface of said support members and having hook-like means thereon to engage the lower edges of said baffle strips to hold the baffle strips against the support members.

Another object of the invention is to make said baffle strips and clamp members available to the farming industry substantially in kit form.

A further object of the invention is to form protrusions on said baffle strips engageable with at least certain of said support members to prevent axial movement of said strips relative to said members and blades.

Details of the foregoing objects and the invention, as well as other objects thereof, are set forth in the following specification and illustrated in the accompanying drawings forming a part thereof.

DETAILED DESCRIPTION OF THE PREFERRED EMBODIMENT

Figure 1:
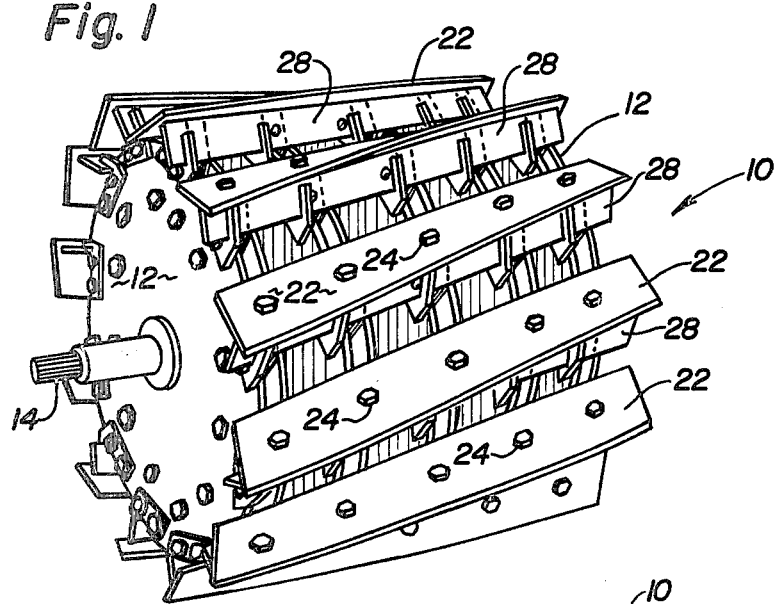
FIG. 1 is a perspective view of an exemplary rotary cutterhead for a forage harvester and in which the improvement comprising baffle strips have been added and are connected thereto by clamping members secured to the disc-like supporting means for the blades.

The rotary cutterhead embodying the principals of the present invention essentially is an improvement over the cutterhead comprising the subject matter of U.S. Pat. No. 3,873,038, which is assigned to the assignee of the present invention. In said prior patent, as well as in the structure of the present invention, the cutterhead 10 comprises a plurality of substantially disc-like support members 12, which are positioned in axially-spaced relationship to each other along a central shaft 14. The shaft 14 is disposed centrally of the support members 12 and the same are connected together by any suitable conventional means, such as splines and keys, not shown, or otherwise. It also will be seen that the disc-like support members 12 are disposed in pairs, said pairs being appreciably spaced axially from each other as clearly shown in FIGS. 1 and 3, whereby, as was inherent in the basic structure of said prior patent, U.S. Pat. No. 3,873,038, the spaces between the pairs of support members, as well as the spaces between each pair of support members 12, is capable during operation of having a substantial amount of cut forage products enter the interior spaces of the cutterhead and rotating around with said cutterhead, as carryover material, which is retained within said interior for a certain period of time before ultimately being through therefrom by other incoming material or until it is accelerated to a sufficient speed to cause it to move to the periphery due to centrifugal force. Accordingly, chopping efficiency of the cutterhead is diminished appreciably.

As in said prior patent, the support members 12 of the present invention receive between the pairs thereof, circumferentially spaced mounting blocks 16, which have portions 18 extending generally radially inward toward the shaft 14 and a plurality of bolts 20 extend respectively through aligned holes in the pairs of support members 12 and the portions 18 of the blocks 16.

Figure 3:
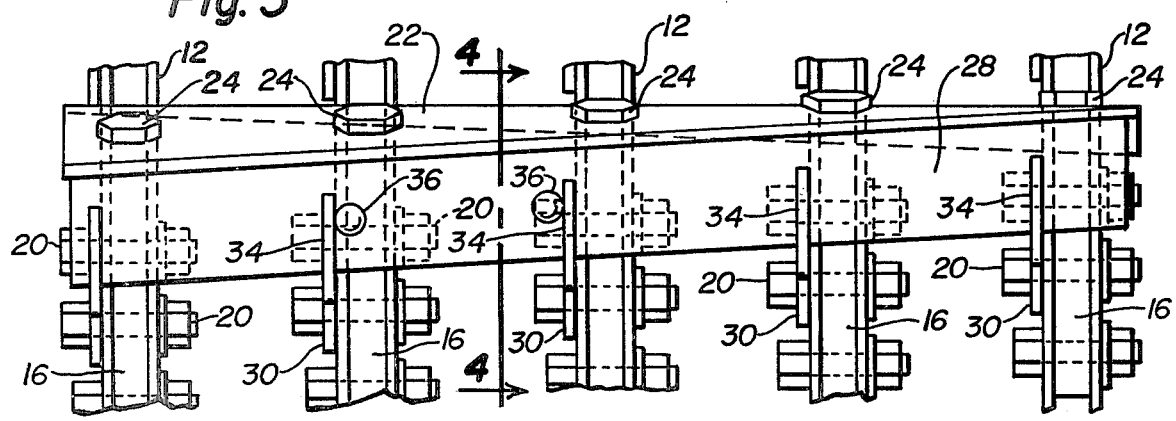
FIG. 3 is an enlarged fragmentary view illustrating details of the cutters and barrier strips as seen generally on the line 3—3 of FIG. 2.

The strip-like blades 22, preferably are skewed, as illustrated in FIGS. 1 and 3, the outer edges thereof being sharpened for coaction relative to fixed shear means mounted within a housing of a harvester in which the cutterhead 10 is rotatably supported and is driven by power means in said harvester. A very effective manner to secure the blades 22 relative to the mounting block 16 is to provide a series of holes spaced longitudinally therealong for the reception of clamping bolts 24, which are threaded into tapped holes 26, see FIG. 4, which extend inward from the outer ends of the mounting blocks 16.

Figure 2:
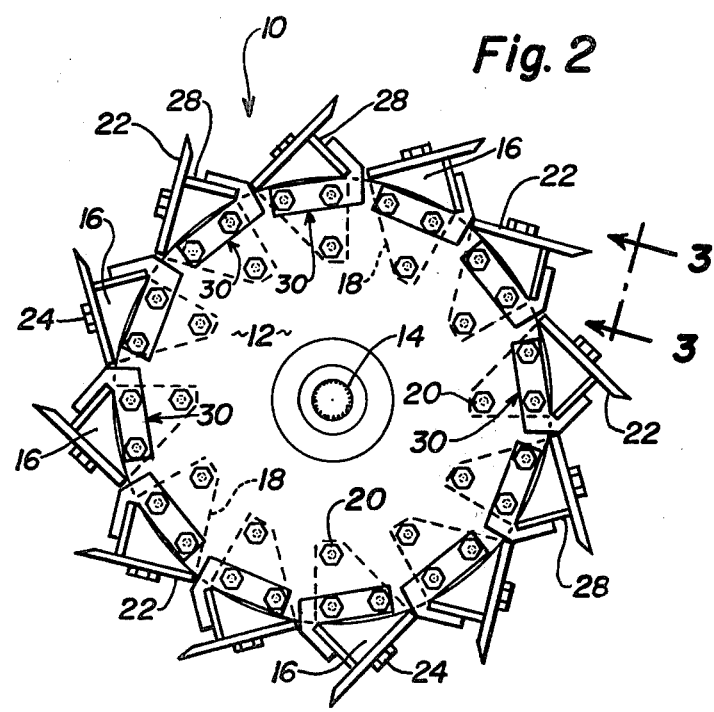
FIG. 2 is an end view of the cutterhead shown in FIG. 1 and illustrated on a somewhat larger scale than employed in FIG. 1.
Figure 4:
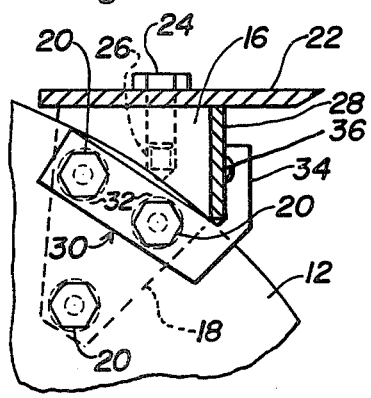
FIG. 4 is a fragmentary sectional end view showing details of the blade support and clamps for the barrier strips substantially as shown on the line 4—4 of FIG. 4.

The primary improvement provided by the present invention comprises adding baffle means to each blade comprising elongated baffle strips 28, which are longitudinally co-extensive with the blades 22 and the width thereof preferably is equal to the exposed front faces of the mounting blocks 16 which is the distance between the periphery of the support members 12 and the lower surface of the blades 22, as clearly shown in FIG. 4. Also, especially as clearly shown in FIG. 2 and 4, the baffle strips 28 are disposed inwardly from the outer cutting edges of the blades 22 at an altitude whereby the baffle intercepts material from the knife before it can enter the interior of the cutterhead, and thereby effectively prevents any appreciable passage of chopped forage material into the interior of the cutterhead 10.

By the employment of such baffle strips, it has been found that the efficiency of the cutterhead is increased as much as approximately 25%, and another important advantage of the present invention is that such baffle strips readily can be sold in kit form and applied to existing cutterheads, especially of the type shown in said prior patent, U.S. Pat. No. 3,873,038, the same being attached thereto by the following means:

A plurality of clamping means comprising hook-like members 30 are provided in the shape best shown in detail in FIG. 4, said members including an elongated portion 32, which is provided with a pair of holes spaced similarly to the bolts 20 by which the mounting blocks 16 are held in operative position, whereby it is only necessary to remove said bolts from existing cutterheads and apply the members 30 to the support members 12 and then replace the bolts and tighten them. The outer hook-like extremity 34 of the members 30 is shaped to firmly abut the forward face of the baffle strips 28, whereby when the strips are secured beneath each blade 22 when the members 30 have been bolted into operative position, the baffle strips are very effectively held in operative position.

For purposes of preventing longitudinal movement of the baffle strips 28 with respect to mounting blocks 16 or clamping members 30, a simple expedient is employed in the form of one or more protrusions 36, preferred examples of which are shown in FIGS. 3 and 4, said protrusions being spaced longitudinally apart distances equal to that between a pair of opposed faces of the hook-like extremities 34, as shown in exemplary manner in FIG. 3.

From the foregoing, it will be seen that the present invention provides effective means for rendering a cutterhead for a forage harvester greatly improves as to efficiency by the application of the baffle strips 28 which are associated intimately with each of the cutter blades 22, said strips extending substantially perpendicularly downward from the under surfaces of each of the blades 22, and the same are secured effectively in operative position by the hook-like clamping members 30, whereby said strips and clamping members may be sold in suitable quantities in a kit for application to existing cutterheads, such application being effected by the use of only normal wrenches and the like, and without requiring skilled mechanics to do so.

The foregoing description illustrated preferred embodiments of the invention. However concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A rotatable cutterhead for a forage harvester of the multi-blade type comprising a shaft, a plurality of axially-spaced support members respectively positioned in parallel planes transverse to said shaft and fixed at the center thereof to said shaft, a plurality of similar chopping blades circumferentially-spaced from each other around and extending between said support members and having cutting edges outermost thereon, and means connecting said blades to the peripheries of said support members, whereby the interior of said cutterhead is open and susceptible to the reception of cut forage products therein, said blades extending substantially tangentially from said support members and having inner surfaces facing the interior of said cutterhead, and open spaces extending substantially radially between the lower surfaces of each blade and the upper surface of the next succeeding blade in the direction of rotation of the cutter head; the improvement comprising the addition of baffle means extending substantially perpendicularly from said inner surfaces of said blades and toward the upper surface of the next preceding blade to substantially close said radial spaces between successive blades, thereby to redirect material from the cutting edge of the knives before it can enter the interior of the cutterhead and thereby maximize the efficiency of operation of said cutterhead.

2. The cutterhead according to claim 1 in which said blades and baffle means are substantially coextensive between the opposite ends of said cutterhead.

3. The cutterhead according to claim 1 in which said blades are skewed similarly a limited amount relative to said shaft and said baffle means are strips which are skewed similarly and are parallel to said cutting edges.

4. The cutterhead according to claim 1 further including clamping members connected to said support members and having hook-like portions engaging the lower edges of said baffle means.

5. The cutterhead according to claim 4 in which at least portions of said support members are relatively flat and said clamping members having portions complementary to said relatively flat portions of said support members and abutting the same, and bolt means connecting said portions of said support members and clamping members.

6. The cutterhead according to claim 4 in which protrusions in said baffle means engage said support members to prevent said strips from accidentally moving axially relative to said blades.

7. The cutterhead according to claim 6 in which said blades and baffle means extend substantially between the opposite ends of said cutterhead.

* * * * *